US012328400B2

(12) United States Patent
Fan et al.

(10) Patent No.: US 12,328,400 B2
(45) Date of Patent: Jun. 10, 2025

(54) DEVICE AND A METHOD FOR SIGNING A METADATA FRAME CORRESPONDING TO AN IMAGE FRAME OF A SEQUENCE OF IMAGE FRAMES

(71) Applicant: Axis AB, Lund (SE)

(72) Inventors: Xing Danielsson Fan, Lund (SE); Niclas Danielsson, Lund (SE)

(73) Assignee: AXIS AB, Lund (SE)

( * ) Notice: Subject to any disclaimer, the term of this patent is extended or adjusted under 35 U.S.C. 154(b) by 292 days.

(21) Appl. No.: 18/142,582

(22) Filed: May 3, 2023

(65) Prior Publication Data
US 2024/0007299 A1 Jan. 4, 2024

(30) Foreign Application Priority Data

May 31, 2022 (EP) .................................... 22176505

(51) Int. Cl.
*H04L 9/40* (2022.01)
*G06T 7/70* (2017.01)
(Continued)

(52) U.S. Cl.
CPC .............. *H04L 9/3247* (2013.01); *G06T 7/70* (2017.01); *G06V 10/25* (2022.01); *H04L 9/0825* (2013.01);
(Continued)

(58) Field of Classification Search
CPC ... H04L 9/3247; H04L 9/0825; H04L 9/3236; H04L 9/0643; G06F 21/64; G06V 10/25; G06T 7/70
See application file for complete search history.

(56) References Cited

U.S. PATENT DOCUMENTS 10,713,391 B2 7/2020 Gonzalez-Banos et al.
2003/0123701 A1 7/2003 Dorrell et al.
(Continued)

FOREIGN PATENT DOCUMENTS

JP 2018-061161 A 4/2018
JP 112887757 A 6/2021
KR 20040034327 A 4/2004

OTHER PUBLICATIONS

"Novelty Search UppdragsHuset", Uppdragshuset AB, Mar. 4, 2022, pp. 1-3.
(Continued)

*Primary Examiner* — Thaddeus J Plecha
(74) *Attorney, Agent, or Firm* — XSENSUS LLP

(57) ABSTRACT

A device, a non-transitory computer-readable storage medium, and a method of signing a metadata frame corresponding to an image frame of a sequence of image frames are disclosed. The metadata frame comprises metadata of one or more detected objects in the image frame, and the metadata of each detected object comprises coordinates defining a location in the image frame of the detected object. A digital signature is generated based on at least a subset of the metadata in the metadata frame, and additional metadata are added to the metadata frame. The additional metadata comprise the digital signature and predefined coordinates which define that the additional metadata comprise the digital signature. Furthermore, a device, a non-transitory computer-readable storage medium, and method of authenticating a digitally signed metadata frame corresponding to an image frame of a sequence of image frames are disclosed.

16 Claims, 4 Drawing Sheets

(51) Int. Cl.
  *G06V 10/25* (2022.01)
  *H04L 9/08* (2006.01)
  *H04L 9/32* (2006.01)

(52) U.S. Cl.
  CPC ........ *H04L 9/3236* (2013.01); *G06V 2201/07* (2022.01)

(56) References Cited

U.S. PATENT DOCUMENTS

| | | |
|---|---|---|
| 2006/0259781 A1 | 11/2006 | Saeki et al. |
| 2008/0072054 A1 | 3/2008 | Choi |
| 2010/0146287 A1 | 6/2010 | Kreiner et al. |
| 2015/0188938 A1 | 7/2015 | Freeze-Skret |
| 2019/0028441 A1* | 1/2019 | Thakkar ................ H04L 9/3247 |
| 2019/0378289 A1* | 12/2019 | Stokking ................ G06T 7/593 |
| 2020/0134230 A1 | 4/2020 | Booth, Jr. et al. |
| 2020/0192934 A1 | 6/2020 | Bertsch et al. |
| 2021/0136455 A1* | 5/2021 | Fujimori .......... H04N 21/26258 |

OTHER PUBLICATIONS

Chris Poppe et al., "Semantic web technologies for video surveillance metadata", Multimedia Tools and Applications, Kluwer Academic Publishers, vol. 56, No. 3, 2012, pp. 439-467.

* cited by examiner

DEVICE AND A METHOD FOR SIGNING A METADATA FRAME CORRESPONDING TO AN IMAGE FRAME OF A SEQUENCE OF IMAGE FRAMES

CROSS-REFERENCE TO RELATED APPLICATION

This application claims priority to European Patent Application No. 22176505.0, filed on May 31, 2022, the entire disclosure of which is incorporated by reference herein.

TECHNICAL FIELD

The present invention relates to authentication of metadata, and specifically to signing a metadata frame corresponding to an image frame of a sequence of image frames.

BACKGROUND

In some applications it is desired to verify that metadata of metadata frames, which metadata frames each correspond to a respective image frame of a sequence of image frames, are intact, i.e. have not been tampered with after generation and that the metadata come from an authentic source. One way of enabling such verification for metadata corresponding to a sequence of image frames is to generate a digital signature for the metadata frames. The digital signature may then be sent in a header of a metadata stream including the metadata frames and used at a receiver side for verifying that the metadata of the metadata frames are intact and that the digital signature was generated by an authentic source. However, if a digital signature is generated for all metadata frames in relation to a sequence of image frames, all metadata frames will be deemed not intact or received from a non-authentic source if the digital signature cannot be verified. Thus, a change in a single metadata frame has the effect that a plurality of metadata frames in a stream segment is deemed not authentic and cannot be trusted. There is a need for improved methods for signing metadata with respect to this issue.

SUMMARY OF THE INVENTION

An object of the present invention is to facilitate enhancements to signing and transmitting metadata corresponding to a sequence of image frames.

According to a first aspect, a method of signing a metadata frame corresponding to an image frame of a sequence of image frames is provided. The metadata frame comprises metadata of one or more detected objects in the image frame. Furthermore, the metadata of each detected object comprises coordinates defining a location in the image frame of the detected object. The method comprises generating a digital signature based on at least a subset of the metadata in the metadata frame, and adding additional metadata to the metadata frame, the additional metadata comprising the digital signature and predefined coordinates which define that the additional metadata comprise the digital signature.

By generating a separate digital signature for a metadata frame, a metadata frame can be authenticated separately. Furthermore, by including the digital signature as additional metadata in the metadata frame and using predefined coordinates to indicate that the additional metadata includes the digital signature, a digital signature can be transmitted for each metadata frame without a need for adapting the format of the metadata frame, i.e. how the metadata is represented, and without a need for adapting the protocol for transmitting the metadata. Instead, a receiving device can be made aware of the predefined coordinates which define that the additional metadata comprise the digital signature. The receiving device only needs to be made aware of the predefined coordinates once and this can be done offline. Furthermore, the digital signature can be transmitted in the metadata frame for which it is to be used for authentication. This is more efficient and discrete than transferring the digital signature separately from the metadata frame.

By a digitally signature is meant any kind of digital signature that enables verifying the authenticity metadata frame.

The predefined coordinates may be dedicated for defining that the additional metadata comprise the digital signature. By this is meant that the predefined coordinates are such that they are not also possible to use as coordinates for an actual object. By selecting such dedicated coordinates there is no risk that a detected object would have the predefined coordinates and hence the metadata of that the detected object will be interpreted as a digital signature.

The predefined coordinates may define a location of an object having no extension. By this, there is no risk that a detected object would have the predefined coordinates since a detected object would have an extension.

The coordinates may for example represent a top left corner and a bottom right corner of a bounding box relating to the detected object, and the predefined coordinates represent the same coordinates for the top left corner and the bottom right corner. By this, there is no risk that a detected object would have the predefined coordinates since a detected object would have different coordinates for the top left corner and the bottom right corner.

In the act of generating the digital signature, the digital signature may be generated based on a private key of a public and private key pair.

The act of generating the digital signature may comprise hashing the at least a subset of the metadata thereby generating a hash, and generating the digital signature based on the hash.

The metadata of each detected object may be represented as a separate item in the metadata frame, wherein each separate item comprises the coordinates defining a location in the image frame of the detected object, and wherein the additional metadata is represented as an additional separate item.

The additional metadata may use the same syntax as the metadata of each detected object.

The method may further comprise forming the metadata frame based on the detected objects in the image frame.

The method may further comprise obtaining the sequence of image frames, and detecting objects in the image frame of the sequence of image frames.

According to a second aspect, a method of authenticating a digitally signed metadata frame corresponding to an image frame of a sequence of image frames is provided. The metadata frame comprises metadata of one or more detected objects in the image frame. The metadata of each detected object comprises coordinates defining a location in the image frame of the detected object. Furthermore, the metadata frame further comprises additional metadata comprising a digital signature for at least a subset of the metadata in the metadata frame and predefined coordinates which define that the additional metadata comprise the digital signature. The method comprises identifying the predefined coordinates which define that the additional metadata comprise the digital signature, retrieving the digital signature from the additional metadata, and authenticating the metadata frame based on the digital signature.

By including the digital signature as additional metadata in the metadata frame and using predefined coordinates to indicate that the additional metadata includes the digital signature, the predefined coordinates digital signature can be identified and the digital signature can be retrieved in a receiver for authentication of the metadata frame without a need for adapting the protocol for transmitting the metadata and without a need for adapting the format of the metadata frame, i.e. how the metadata is represented. Instead, a receiving device only needs to be made aware of the predefined coordinates which define that the additional metadata comprise the digital signature. The receiving device only needs to be made aware of the predefined coordinates once and this can be done offline.

According to a third aspect, a non-transitory computer-readable storage medium is provided having stored thereon instructions for implementing the method according to the first aspect or the second aspect, when executed in a device having at least one processor.

According to a fourth aspect, a device for signing a metadata frame corresponding to an image frame of a sequence of image frames is provided. The metadata frame comprises metadata of one or more detected objects in the image frame. Furthermore, the metadata of each detected object comprises coordinates defining a location in the image frame of the detected object. The device comprises circuitry configured to execute a generating function configured to generate a digital signature using at least a subset of the metadata in the metadata frame, and an adding function configured to add additional metadata to the metadata frame, the additional metadata comprising the digital signature and predefined coordinates which define that the additional metadata comprise the digital signature.

The generating function may be configured to hash the at least a subset of the metadata thereby generating a hash, and generate the digital signature based on the hash.

The circuitry may be further configured to execute a forming function configured to form the metadata frame based on the detected objects in the image frame.

The circuitry may be further configured to execute an obtaining function configured to obtain the sequence of image frames, and a detecting function configured to detect objects in the image frame of the sequence of image frames.

The above-mentioned optional additional features of the method according to the first aspect, when applicable, apply to the device according to the fourth aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

Figure 1:
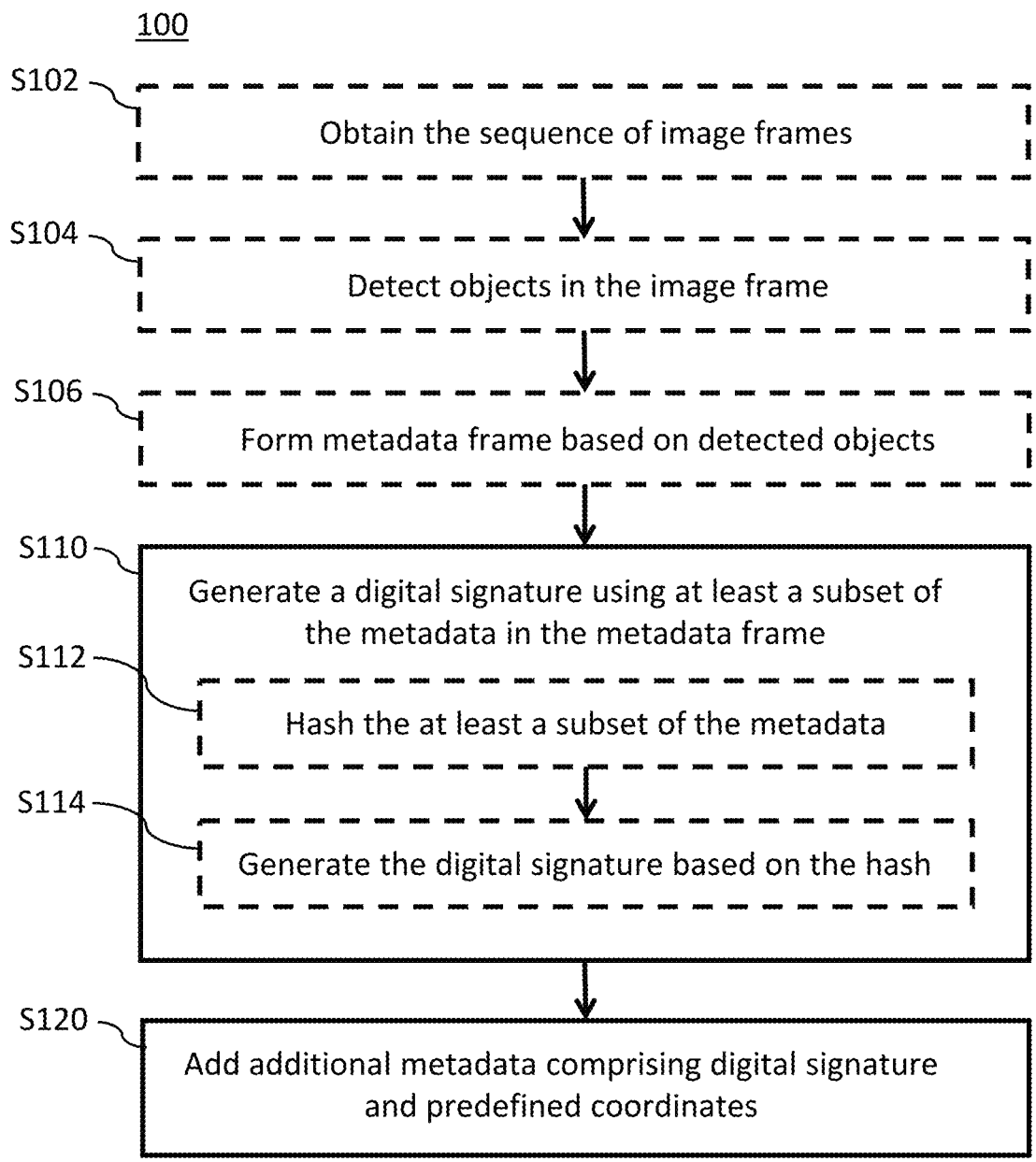
FIG. 1 shows a flow chart in relation to embodiments of a method of signing metadata corresponding to an image frame of a sequence of image frames.

The present invention will now be described hereinafter with reference to the accompanying drawings, in which currently preferred embodiments of the invention are illustrated. This invention may, however, be embodied in many different forms and should not be construed as limited to the embodiments set forth herein.

Embodiments of the invention may be used to verify the authenticity of metadata to ensure that metadata are intact, i.e. have not be tampered with after generation, and come from an authentic source, in applications where a metadata frame corresponds to an image frame of a sequence of image frames and each metadata frame includes metadata in relation to one or more objects detected in the corresponding image frame and defines a location of each object by means of object coordinates. The metadata are typically generated by means of analysis of the image frame and may for example further relate to further analytics information such as object id, object class, object color, etc. The metadata may relate to other things than objects as well, such as information relating to audio, radar etc. It is understood that the format and syntax used to represent the metadata is predefined such that both the sender and the receiver are aware of the format and syntax, e.g. by means of a standard. One standard for metadata representation and transmission is ONVIF profile M. An example of how metadata according to the ONVIF profile M look like for one metadata frame including metadata for one object is shown below.

```
<tt:Frame UtcTime="2019-06-10T12:24:57.321">
    <tt: Transformation>
        <tt:Translate x="-1.0" y="-1.0"/>
        <tt:Scale x="0.003125" y="0.00416667"/>
    </tt: Transformation>
    <tt:Object ObjectId="12">
        <tt:Appearance>
            <tt:Shape>
                <tt:Bounding Box left="20.0" top="180.0"
                    right="100.0" bottom="30.0"/>
                <tt:CenterOfGravity x="60.0" y="80.0"/>
            </tt:Shape>
            <tt:Class>
```

```
                <tt: Type Likelihood="0.9">Vehicle</tt:
Type>
                </tt:Class>
            </tt:Appearance>
        </tt:Object>
</tt:Frame>
```

The tag "BoundingBox" is used for representing the image coordinates of a bounding box for a detected object. In this example, the coordinates for object with ID 12 is represented by a bounding box with the image coordinates (20,180) for top left corner and (30,100) for bottom right corner. If the frame would have included a further object, metadata for such a further object would have been included in relation to the object which would have had a different ID, i.e. a different value for the tag "ObjectId".

At a receiver side including a decoder, the digital signature for the metadata frame can be used to verify the authenticity of the metadata frame. For example, if the digital signature for the metadata frame has been created by encryption of a hash of at least a portion of the metadata frame by means of a private key of a public and private key pair, it can be verified that the metadata are intact and come from the authentic source by decryption using the public key of the public and private key pair of the digital signature and comparison of the result to a corresponding hash of the at least a portion of the metadata frame as received at the receiver side. If they are equal, the metadata frame is intact and comes from the authentic source, and if they are not equal, the metadata frame is either not intact (has been changed/tampered with) or does not come from the authentic source.

In the following, embodiments of a method 100 of signing a metadata frame corresponding to an image frame of a sequence of image frames will be discussed with reference to FIG. 1. The metadata frame comprises metadata of one or more detected objects in the image frame. Furthermore, the metadata of each detected object comprises coordinates defining a location in the image frame of the detected object. The method 100 comprises generating S110 a digital signature based on at least a subset of the metadata in the metadata frame, and adding S120 additional metadata to the metadata frame. The additional metadata comprise the digital signature and predefined coordinates which define that the additional metadata comprise the digital signature. This is different from prior art in which a digital signature is for example sent in a header of a metadata stream and relates to all metadata frames in the metadata stream. By including the digital signature as additional metadata in the metadata frame and using predefined coordinates to indicate that the additional metadata includes the digital signature, a respective digital signature can be transmitted for each metadata frame. Furthermore, by the predefined coordinates, the digital signature can be identified, and the digital signature can be retrieved in a receiver for authentication of the metadata frame without a need for adapting the protocol for transmitting the metadata. This can be achieved without a need for adapting the format of the metadata frame, i.e. how the metadata is represented. Instead, a receiving device only needs to be made aware of the predefined coordinates which define that the additional metadata comprise the digital signature. The receiving device only needs to be made aware of the predefined coordinates once and this can be done offline.

By the digital signature being based on 'at least a subset' of the metadata in the metadata frame is meant that the digital signature only needs to be based on the metadata of the metadata frame which are to be possible to verify. For example, the digital signature may be based on metadata relating to only a subset of the objects detected in a frame. For example, it may be decided that metadata only for one or more specific types of objects need to be possible to verify. In such a case the digital signature may be generated based on the metadata relating to objects of those one or more specific types of objects.

It is understood that the predefined coordinates will also be known to a device receiving the metadata frame. The receiving device will interpret the metadata according to a predefined format and syntax used, and interpret the metadata accordingly. When interpreting the additional metadata, the receiving device will identify the coordinates to be coordinates that define that the additional metadata comprise the digital signature.

The predefined coordinates are preferably static, i.e. the same predefined coordinates are used over time to define that the additional metadata comprise the digital signature. In alternative, the predefined coordinates may vary over time but in a way such that a receiving device will know which coordinates are used in relation to each metadata frame.

The predefined coordinates may be dedicated for defining that the additional metadata comprise the digital signature, i.e. they may not also be used as coordinates for an actual object. By selecting such dedicated coordinates there is no risk that an actual object would have the predefined coordinates and hence the metadata of that actual object will be interpreted as a digital signature. The method 100 may then further comprise the acts of selecting predefined coordinates and dedicating the predefined coordinates to define that the additional metadata comprises the digital signature.

Furthermore, if the predefined format and syntax used for representing the metadata requires the additional metadata to specify an object in order to include coordinates, a dummy object may be identified using an identification that differs from all actual objects identified for which metadata are provided in the metadata frame. Hence, the additional metadata may further include an object id and the predefined coordinates may be indicated to relate to that object id.

In order to achieve dedicated predefined coordinates, the predefined coordinates may be such that they cannot relate to an actual object. For example, the predefined coordinates may define a location of an object having no extension. For example, if the coordinates represent a top left corner and a bottom right corner of a bounding box relating to the detected object, such as in ONVIF profile M, the predefined coordinates would then have the same coordinates for the top left corner as for the bottom right corner. This is applicable also when using a different format and syntax where the bounding box is defined by the top right corner and the bottom left corner. In another example, the coordinates may represent a top left corner and a distance to a bottom right corner. To define a location of an object having no extension, the predefined coordinates would then have any coordinates for the top left corner and an indication of zero distance to the bottom right corner. This is applicable also if the bounding box is defined by the coordinates of any of the other corners and a distance to the corner diagonally across the bounding box from that corner. The predefined coordinates may be the same over time or may vary as long as they indicate an object having no extension, i.e. a bounding box of zero pixels.

Other alternatives of achieving dedicated predefined coordinates are also envisaged. For example, the predefined coordinates may be such that they the object has a negative extension, e.g. such that the top left corner is situated below and/or the right of the bottom right corner. In another example, the predefined coordinates may be such that the object is fully or partially located outside the image frame, e.g. the top left corner and/or the bottom right corner is located outside the image frame.

An advantage of using predefined coordinates that are such that they cannot relate to an actual object is that if a device receiving the metadata frame is not aware of the predefined coordinates, it will simply ignore the additional metadata since the predefined coordinates cannot be interpreted as relating to an object.

The digital signature may be any type of digital signature that enables verifying the authenticity. For example, the digital signature may be generated based on a private key of a public and private key pair. For example, RSA (Rivest-Shamir-Adleman) 256-bit encryption, the Digital Signature Algorithm (DSA) and the Elliptic Curve Digital Signing Algorithm (ECDSA) may be used for generating the digital signature. The digital signature for the metadata frame may be generated by applying the private key to the metadata of the metadata frame or to a subset of the metadata. However, in order to reduce the size of the digital signature, the metadata may first be hashed S112 by means of a hash function, such as a cryptographic hash function, to generate a hash. The digital signature may then be generated S114 based on the hash, e.g. by applying the private key to the hash. Examples of cryptographic hash functions are MD5, SHA-1, SHA-2 (SHA-256/SHA-512), SHA-3, BLAKE-3.

The metadata of each detected object may be represented as a separate item in the metadata frame, wherein each separate item comprises the coordinates defining a location in the image frame of the detected object. As an example, for metadata according to the ONVIF profile M as exemplified hereinabove, an item relating to an object are between and including the lines stating "<tt:Object ObjectId"12">" and the line stating </tt:Object> the metadata. In such a case, the additional metadata may also be represented as an additional separate item using the same format and syntax.

The additional metadata may use the same syntax and/or format as the metadata of each detected object. Hence, the syntax and/or format used for a detected object is used also for the additional metadata. Hence, the additional metadata will be interpreted as metadata relating to an object and a receiving device will be able to interpret the additional data. When the receiving device identifies the predefined coordinates, the receiving device will be able to interpret the additional metadata as including the digital signature.

For example, if additional metadata are added as metadata relating to an object according to the ONVIF profile M, the tag "BoundingBox" may include "left="20.0" top="180.0" right="20.0" bottom "180.0" or any other coordinates that indicate a bounding box of no extension, i.e. of zero pixels. The digital signature could then be included in the tag "Type", i.e. in the same position as where "Vehicle" is in the example of a metadata frame according ONVIF profile M hereinabove.

The digital signature may be included in the additional metadata using an existing variable or tag according to the syntax and format used for metadata frames which is used to provide metadata regarding some other feature of an object. The only requirement then would be that the existing variable or tag is allowed to include sufficient number of bits to encompass the digital signature. The receiving device would then have to be made aware of that when the predefined coordinates are identified, that the existing tag or variable is used to include the digital signature in the additional metadata. In alternative, a new variable or tag "Digital Signature" or similar may be added.

The method 100 may further comprise obtaining S102 the sequence of image frames. The sequence of image frames may be obtained S102 by capturing of the sequence of image frames by a camera if the method 100 is performed in the camera. In alternative, the sequence of image frames may be obtained S102 by receipt from the camera directly or via another device if the method is performed in a separate device from the camera.

The method 100 may then further comprise detecting S104 objects in the image frame of the sequence of image frames. The objects may be detected using any type of object detection method.

The method 100 may further comprise forming S106 the metadata frame based on the detected objects in the image frame. Forming the metadata frame may be based on information from the object detection method and/or further analysis of the detected objects.

Even if the digital signature is described in relation to one metadata frame, a digital signature may be included in a metadata frame which digital signature is for two or more metadata frames, e.g. for sequential metadata frames relating to all image frames of a group of pictures (GOP). The digital signature would then be based on at least a subset of the metadata of each of the metadata frames.

In the following, embodiments of a method 200 of authenticating a digitally signed metadata frame corresponding to an image frame of a sequence of image frames will be discussed with reference to FIG. 2. The metadata frame comprises metadata of one or more detected objects in the image frame. The metadata of each detected object comprises coordinates defining a location in the image frame of the detected object. Furthermore, the metadata frame comprises additional metadata comprising a digital signature for at least a subset of the metadata in the metadata frame and predefined coordinates which define that the additional metadata comprise the digital signature. In other words, the metadata frame is a metadata frame as generated by the method 100 described with respect to FIG. 1. The method 200 comprises identifying S210 the predefined coordinates which define that the additional metadata comprise the digital signature. The digital signature is then retrieved S220 from the additional metadata, and the at least a subset of the metadata is authenticated S230 based on the digital signature. How the digital signature is used to authenticate (verify the authenticity of) the metadata frame depends on what type of digital signature is used. For example, the digital signature for the metadata frame may have been created by applying a private key of a public and private key pair to a hash of at least a portion of the metadata frame. The authenticity of the metadata frame can then be verified by decrypting the digital signature using the public key of the public and private key pair and comparing the result to a corresponding hash of the at least a portion of the metadata frame as received in the metadata frame. The same hash function should be used to generate the hash from the at least as subset of the metadata as received as used to generate the hash on which the digital signature is based. If they are equal, the authenticity of the metadata frame is verified, i.e. the metadata frame is intact and comes from the authentic source. If they are not equal, the authenticity of the metadata frame is not verified, and either the metadata frame is not intact or does not come from the authentic source.

Figure 3:
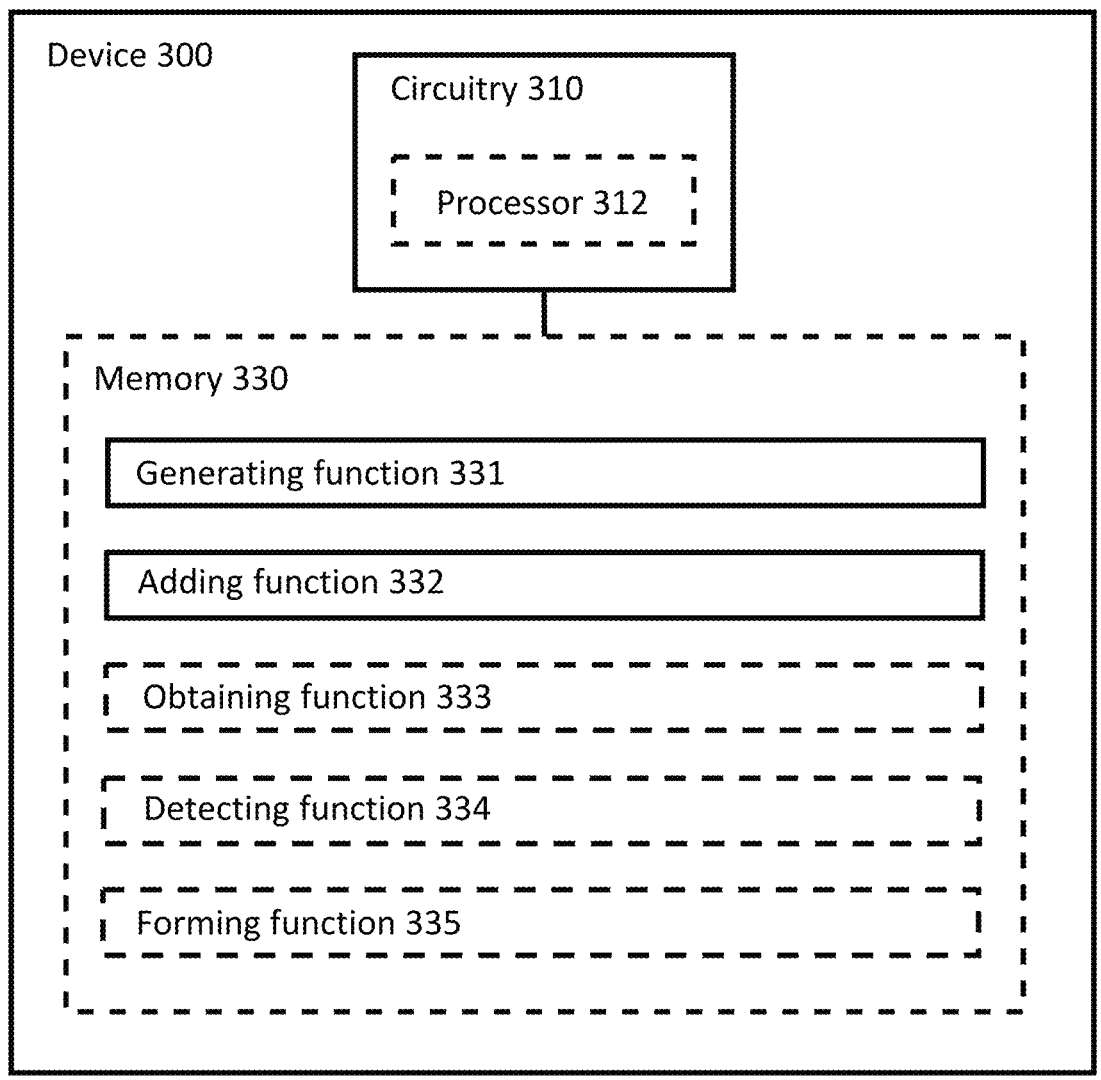
FIG. 3 shows a schematic diagram in relation to embodiments of a device for signing metadata corresponding to an image frame of a sequence of image frames.

In the following, embodiments of a device 300 for signing metadata corresponding to an image frame of a sequence of image frames will be discussed with reference to FIG. 3. The metadata frame comprises metadata of one or more detected objects in the image frame. Furthermore, the metadata of each detected object comprises coordinates defining a location in the image frame of the detected object. The device 300 comprises circuitry 310. The circuitry 310 is configured to carry out functions of the device 300. The circuitry 310 may include a processor 312, such as a central processing unit (CPU), microcontroller, or microprocessor. The processor 312 is configured to execute program code. The program code may for example be configured to carry out the functions of the device 300.

The device 300 may further comprise a memory 330. The memory 330 may be one or more of a buffer, a flash memory, a hard drive, a removable media, a volatile memory, a non-volatile memory, a random access memory (RAM), or another suitable device. In a typical arrangement, the memory 330 may include a non-volatile memory for long term data storage and a volatile memory that functions as system memory for the circuitry 310. The memory 330 may exchange data with the circuitry 310 over a data bus. Accompanying control lines and an address bus between the memory 330 and the circuitry 310 also may be present.

Functions of the device 300 may be embodied in the form of executable logic routines (e.g., lines of code, software programs, etc.) that are stored on a non-transitory computer readable medium (e.g., the memory 330) of the system 300 and are executed by the circuitry 310 (e.g., using the processor 312). Furthermore, the functions of the system device may be a stand-alone software application or form a part of a software application that carries out additional tasks related to the system device. The described functions may be considered a method that a processing unit, e.g. the processor 312 of the circuitry 310 is configured to carry out. Also, while the described functions may be implemented in software, such functionality may as well be carried out via dedicated hardware or firmware, or some combination of hardware, firmware and/or software.

The circuitry 310 is configured to execute a generating function 331 configured to generate a digital signature using at least a subset of the metadata in the metadata frame.

The circuitry 310 is further configured to execute an adding function 332 configured to add additional metadata to the metadata frame, the additional metadata comprising the digital signature and predefined coordinates which define that the additional metadata comprise the digital signature.

The generating function 331 may be configured to hash the at least a subset of the metadata thereby generating a hash, and generate the digital signature based on the hash.

The circuitry 330 may be further configured to execute an obtaining function 333 configured to obtain the sequence of image frames, and a detecting function 334 configured to detect objects in the image frame of the sequence of image frames.

The circuitry 310 may be further configured to execute a forming function 335 configured to form the metadata frame based on the detected objects in the image frame.

The device 300 may be realized in a single physical unit, such that all of the functions are implemented in the single physical unit. In alternative, the device 300 may be realized in more than one physical unit, such that the functions are implemented in two or more different physical units.

The functions carried out by the circuitry 310 may be further adapted as the corresponding steps of the embodiments of the method described in relation to FIG. 1.

Figure 4:
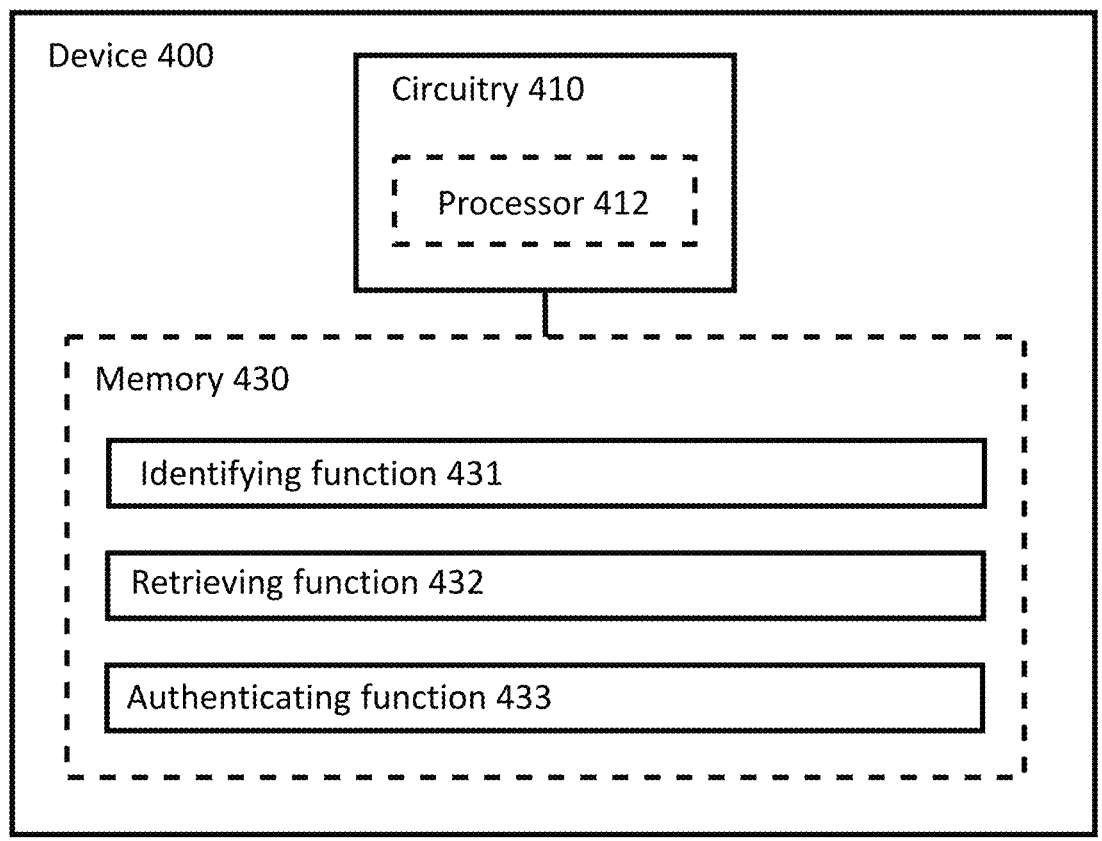
FIG. 4 shows a schematic diagram in relation to embodiments of a device for authenticating a digitally signed metadata frame corresponding to an image frame of a sequence of image frames.

In the following, embodiments of a device 400 for authenticating a digitally signed metadata frame corresponding to an image frame of a sequence of image frames will be discussed with reference to FIG. 4. FIG. 4 shows a schematic diagram in relation to embodiments of a device 400. The metadata frame comprises metadata of one or more detected objects in the image frame. The metadata of each detected object comprises coordinates defining a location in the image frame of the detected object. Furthermore, the metadata frame further comprises additional metadata comprising a digital signature for at least a subset of the metadata in the metadata frame and predefined coordinates which define that the additional metadata comprise the digital signature. The device 400 comprises circuitry 410. The circuitry 410 is configured to carry out functions of the device 400. The circuitry 410 may include a processor 412, such as a central processing unit (CPU), microcontroller, or microprocessor. The processor 412 is configured to execute program code. The program code may for example be configured to carry out the functions of the device 400.

The device 400 may further comprise a memory 430. The memory 430 may be one or more of a buffer, a flash memory, a hard drive, a removable media, a volatile memory, a non-volatile memory, a random access memory (RAM), or another suitable device. In a typical arrangement, the memory 430 may include a non-volatile memory for long term data storage and a volatile memory that functions as system memory for the circuitry 410. The memory 430 may exchange data with the circuitry 410 over a data bus. Accompanying control lines and an address bus between the memory 430 and the circuitry 410 also may be present.

Functions of the device 400 may be embodied in the form of executable logic routines (e.g., lines of code, software programs, etc.) that are stored on a non-transitory computer readable medium (e.g., the memory 430) of the system 400 and are executed by the circuitry 410 (e.g., using the processor 412). Furthermore, the functions of the system device may be a stand-alone software application or form a part of a software application that carries out additional tasks related to the system device. The described functions may be considered a method that a processing unit, e.g. the processor 412 of the circuitry 410 is configured to carry out. Also, while the described functions may be implemented in software, such functionality may as well be carried out via dedicated hardware or firmware, or some combination of hardware, firmware and/or software.

The circuitry 410 is configured to execute an identifying function 431 configured to identify the predefined coordinates which define that the additional metadata comprise the digital signature.

The circuitry 410 is further configured to execute a retrieving function 432 configured to retrieve the digital signature from the additional metadata.

The circuitry 410 is further configured to execute an authenticating function 433 configured to authenticate the metadata frame based on the digital signature.

By including the digital signature as additional metadata in the metadata frame and using predefined coordinates to indicate that the additional metadata includes the digital signature, the predefined coordinates digital signature can be identified and the digital signature can be retrieved in a receiver for authentication of the metadata frame without a need for adapting the protocol for transmitting the metadata and without a need for adapting the format of the metadata frame, i.e. how the metadata is represented. Instead, the device 400 only needs to be made aware of the predefined coordinates which define that the additional metadata comprise the digital signature. The device 400 only needs to be made aware of the predefined coordinates once and this can be done offline.

The authenticating function 433 may be configured to hash the received at least a subset of the metadata thereby generating a hash, decrypt the digital signature and compare the hash to the decrypted digital signature. If they are equal, the metadata frame is authenticated, i.e. the metadata frame is intact and comes from the authentic source. If they are not equal, the metadata frame is either not intact or does not come from the authentic source.

The device 400 may be realized in a single physical unit, such that all of the functions are implemented in the single physical unit. In alternative, the device 400 may be realized in more than one physical unit, such that the functions are implemented in two or more different physical units.

Figure 2:
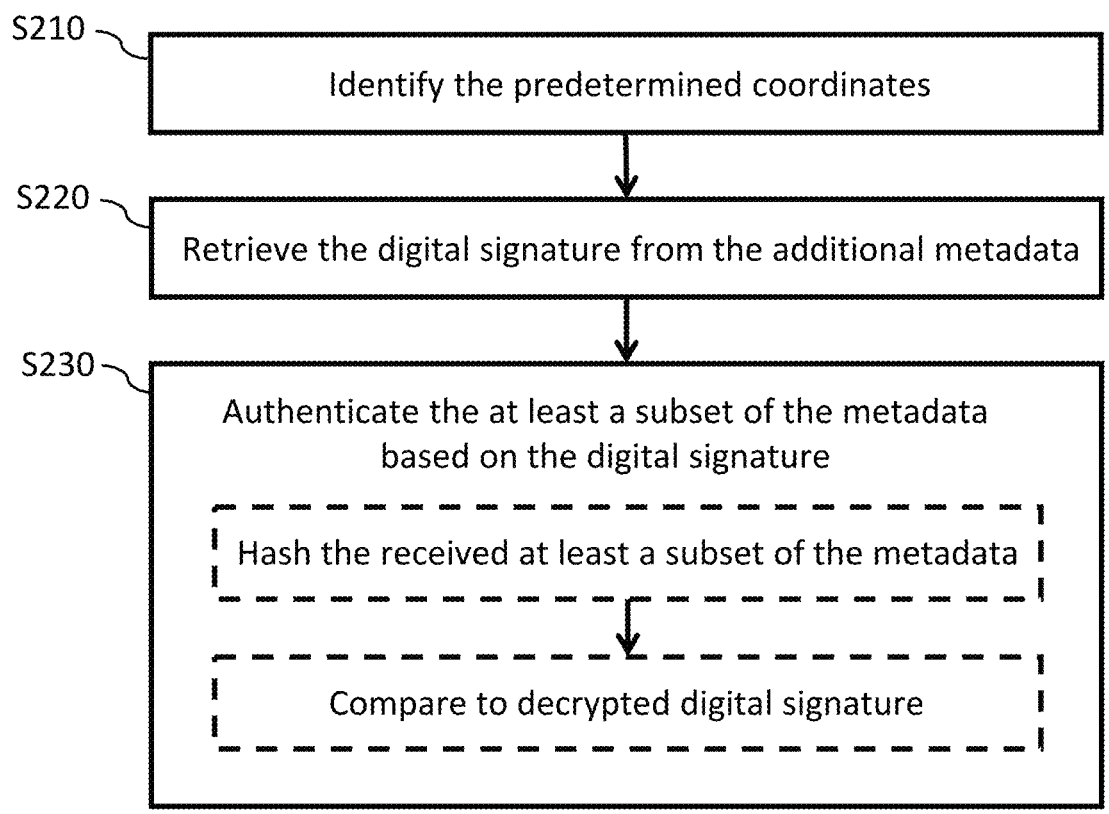
FIG. 2 shows a flow chart in relation to embodiments of a method of authenticating a digitally signed metadata frame corresponding to an image frame of a sequence of image frames.

The functions carried out by the circuitry 410 may be further adapted as the corresponding steps of the embodiments of the method described in relation to FIG. 2.

The invention claimed is:

1. A method of signing a metadata frame corresponding to an image frame of a sequence of image frames, wherein the metadata frame comprises metadata of one or more detected objects in the image frame, wherein the metadata of each detected object comprises coordinates defining a location in the image frame of the detected object, the method comprising:
generating a digital signature based on at least a subset of the metadata in the metadata frame; and
adding additional metadata to the metadata frame, the additional metadata comprising the digital signature and predefined coordinates which define that the additional metadata comprise the digital signature.

2. The method of claim 1, wherein the predefined coordinates are dedicated for defining that the additional metadata comprise the digital signature.

3. The method of claim 1, wherein the predefined coordinates define a location of an object having no extension.

4. The method of claim 1, wherein the coordinates represent a top left corner and a bottom right corner of a bounding box relating to the detected object, and the predefined coordinates represent the same coordinates for the top left corner and the bottom right corner.

5. The method of claim 1, wherein, in the act of generating the digital signature, the digital signature is generated based on a private key of a public and private key pair.

6. The method of claim 1, wherein the act of generating the digital signature comprises:
hashing the at least a subset of the metadata thereby generating a hash; and
generating the digital signature based on the hash.

7. The method of claim 1, wherein the metadata of each detected object is represented as a separate item in the metadata frame, wherein each separate item comprises the coordinates defining a location in the image frame of the detected object, and wherein the additional metadata is represented as an additional separate item.

8. The method of claim 1, wherein the additional metadata uses the same syntax as the metadata of each detected object.

9. The method of claim 1, further comprising:
forming the metadata frame based on the one or more detected objects in the image frame.

10. The method of claim 9, further comprising:
obtaining the sequence of image frames, and
detecting one or more objects in the image frame of the sequence of image frames.

11. A method of authenticating a digitally signed metadata frame corresponding to an image frame of a sequence of image frames, wherein the metadata frame comprises metadata of one or more detected objects in the image frame, wherein the metadata of each detected object comprises coordinates defining a location in the image frame of the detected object, and wherein the metadata frame further comprises additional metadata comprising a digital signature for at least a subset of the metadata in the metadata frame and predefined coordinates which define that the additional metadata comprises the digital signature, the method comprising:
identifying the predefined coordinates which define that the additional metadata comprise the digital signature;
retrieving the digital signature from the additional metadata; and
authenticating the metadata frame based on the digital signature.

12. A non-transitory computer-readable storage medium having stored thereon instructions for implementing the method according to claim 1 when executed in a device having at least one processor.

13. A device for signing a metadata frame corresponding to an image frame of a sequence of image frames, wherein the metadata frame comprises metadata of one or more detected objects in the image frame, wherein the metadata of each detected object comprises coordinates defining a location in the image frame of the detected object, the device comprising circuitry configured to execute:
a generating function configured to generate a digital signature using at least a subset of the metadata in the metadata frame; and
an adding function configured to add additional metadata to the metadata frame, the additional metadata comprising the digital signature and predefined coordinates which define that the additional metadata comprise the digital signature.

14. The device of claim 13, wherein the generating function is configured to:
hash the at least a subset of the metadata thereby generating a hash; and
generate the digital signature based on the hash.

15. The device of claim 13, wherein the circuitry is further configured to execute:
a forming function configured to form the metadata frame based on the detected objects in the image frame.

16. The device of claim 13, wherein the circuitry is further configured to execute:
an obtaining function configured to obtain the sequence of image frames, and
a detecting function configured to detect objects in the image frame of the sequence of image frames.

* * * * *